US008944513B2

(12) United States Patent  
Suzuki et al.

(10) Patent No.: US 8,944,513 B2  
(45) Date of Patent: Feb. 3, 2015

(54) FOOTREST APPARATUS FOR VEHICLE SEAT

(71) Applicant: Shiroki Corporation, Kanagawa (JP)

(72) Inventors: Hiroyuki Suzuki, Kanagawa (JP); Takuji Yamazaki, Kanagawa (JP); Takayuki Sakurai, Kanagawa (JP)

(73) Assignee: Shiroki Corporation, Fujisawa-shi, Kanagawa (JP)

( * ) Notice: Subject to any disclaimer, the term of this patent is extended or adjusted under 35 U.S.C. 154(b) by 0 days.

(21) Appl. No.: 13/945,404

(22) Filed: Jul. 18, 2013

(65) Prior Publication Data

US 2014/0021765 A1    Jan. 23, 2014

(30) Foreign Application Priority Data

Jul. 18, 2012   (JP) ................. 2012-159524

(51) Int. Cl.
*B60N 3/06* (2006.01)
*B60N 2/44* (2006.01)

(52) U.S. Cl.
CPC .............. *B60N 3/063* (2013.01); *B60N 2/4495* (2013.01)
USPC ................. 297/423.26; 297/423.28

(58) Field of Classification Search
CPC ........................................................ B60N 3/063
USPC ........................................ 297/423.26, 423.28
See application file for complete search history.

(56) References Cited

U.S. PATENT DOCUMENTS

| 7,824,349 B2 * | 11/2010 | Lv | 297/423.28 |
| 7,866,755 B2 * | 1/2011 | Okano | 297/423.26 X |
| 8,708,417 B2 * | 4/2014 | Mejuhas | 297/423.26 |

FOREIGN PATENT DOCUMENTS

JP    2008 049066    3/2008

OTHER PUBLICATIONS

T S Tec KK, "Ottoman Device and Seat," Patent Abstracts of Japan, Publication Date: Mar. 6, 2008; English Abstract of JP-2008 049066.

* cited by examiner

*Primary Examiner* — Anthony D Barfield
(74) *Attorney, Agent, or Firm* — Millen, White, Zelano, Branigan, P.C.

(57) ABSTRACT

A footrest apparatus for a vehicle seat includes a fixed member fixed to the vehicle seat, a footrest movable between a retracted position and an operating range, and a link mechanism which connects the fixed member and the footrest to each other and moves the footrest between the retracted position and the operating range by extending and contracting. The link mechanism includes a pair of link members which rotate in synchronization with each other, each of which is formed as a plate that is orthogonal to a widthwise direction of the vehicle seat, and a connecting member formed as a plate which extends in the widthwise direction, wherein common edges of the pair of link members are connected to opposite ends of the connecting member in the widthwise direction, respectively.

6 Claims, 8 Drawing Sheets

FOOTREST APPARATUS FOR VEHICLE SEAT

BACKGROUND OF THE INVENTION

1. Field of the Invention

The present invention relates to a footrest apparatus used with a vehicle seat.

2. Description of Related Art

A footrest (ottoman) apparatus, of the related art, for use with a vehicle seat is disclosed in, e.g., Japanese Unexamined Patent Publication No. 2008-49066.

This footrest apparatus is provided with a fixed member (bracket) which is fixed to a vehicle seat, an extendable link mechanism which is supported at one end (rear end) thereof by the fixed member, a footrest which is supported by the other end (front end) of the link mechanism, and a gas damper (biaser), the ends of which are connected to the fixed member and the link mechanism, respectively. The gas damper is provided with a cylinder which is fixed to the fixed member, a piston which is slidable with respect to the cylinder, the end (outer end) of the piston being connected to the link mechanism, and a locking device which locks and unlocks the extension/contraction operation of the gas damper (the sliding operation of the piston with respect to the cylinder). The aforementioned link mechanism has mutually-associated pairs of link members (which rotate in synchronization with each other).

When each of the link mechanism and the gas damper is in a contracted state and the locking device is in a locked state, the footrest is in the retracted position, in which the footrest is positioned close to the fixed member.

Releasing the locked state of the locking device causes the link mechanism to extend by the biasing force of the gas damper (the moving force of the piston), thus causing the footrest to move from the retracted position into an operating range in front of the retracted position. Subsequently, returning the locking device to the locked state upon the footrest moving to a proper position (desired position) for the occupant causes the gas damper to become impossible to extend or contract, which prevents the link mechanism from changing in shape. Consequently, the footrest is held in this position, thus allowing the occupant who sits in the seat to place his/her legs on the footrest.

However, the above described link mechanism has the drawback that it is low in mechanical strength.

SUMMARY OF THE INVENTION

The present invention provides a footrest apparatus which is used with a vehicle seat and the link mechanism of which is superior in mechanical strength.

According an aspect of the present invention, a footrest for use with a vehicle seat is provided, including a fixed member which is fixed to the vehicle seat, a footrest movable between a retracted position that approaches the fixed member and an operating range that is away from the fixed member, and a link mechanism which connects the fixed member and the footrest to each other and moves the footrest between the retracted position and the operating range by extending and contracting. The link mechanism includes a pair of link members which rotate in synchronization with each other, each of which is formed as a plate that is orthogonal to a widthwise direction of the vehicle seat, and a connecting member formed as a plate which extends in the widthwise direction, wherein common edges of the pair of link members are connected to opposite ends of the connecting member in the widthwise direction, respectively.

According to the present invention, the mechanical strength of the link mechanism can be improved because the pair of link members are connected via the connecting member.

It is desirable for at least one of the link mechanism and the fixed member to partly enter a space surrounded by the connecting member and the pair of link members when the footrest is positioned in the retracted position.

Accordingly, the footrest apparatus has a structure such that common-side (same-side) edges of the pair of link members are connected to opposite ends of the connecting member, which is formed as a plate member, in the widthwise direction of the vehicle seat, respectively, and accordingly, a large space can be surrounded by the connecting member and the pair of link members without being obstructed. Accordingly, it is possible to increase the volume of the above-mentioned space for accommodating part of the link mechanism or the fixed member when the footrest is in the retracted position, thus making it possible to reduce the size of the entire footrest apparatus in a retracted state by a greater amount.

It is desirable for the connecting member and the pair of link members to be integrally formed from a plate by bending.

According to this configuration, if the connecting member and the pair of link members are integrally formed from a plate, the ease of assembly of the footrest is improved.

It is desirable for the pair of link members to be connected to the footrest. When the footrest is positioned in the operating range, a member of the link mechanism that is different from the connecting member and the pair of link members is positioned between the connecting member and the vehicle seat.

Accordingly, when the footrest is positioned in the operating range, if a member of the link mechanism, which is different from the connecting member and the pair of link members, is positioned between the connecting member and the vehicle seat the possibility of hands, feet, etc., of the occupant, who is sitting on the vehicle seat, accidentally touching the above-mentioned members of the footrest apparatus can be reduced.

It is desirable for the connecting member to include a first connecting member and a second connecting member, wherein the pair of link members includes a first pair of link members and a second pair of link members. The link mechanism includes a first integrated link member which includes the first connecting member and the first pair of link members, and a second integrated link member which includes the second connecting member and the second pair of link members. The second integrated link member enters a space surrounded by the first connecting member and the first pair of link members when the footrest is positioned in the retracted position.

Accordingly, the rigidity of the footrest apparatus is improved because the link mechanism is provided with the first integrated link member and the second integrated link member.

Additionally, since the second integrated link member enters the space (internal space of the first integrated link member) surrounded by the first connecting member and the first pair of link members when the footrest is positioned at the retracted position, the size of the entire footrest apparatus in a retracted state can be further reduced.

It is desirable for the first integrated link member and the second integrated link member to be pivotally connected to each other to be rotatable relative to each other about an axis parallel to the widthwise direction.

The present disclosure relates to subject matter contained in Japanese Patent Application No. 2012-159524 (filed on Jul. 18, 2012) which is expressly incorporated herein by reference in its entirety.

BRIEF DESCRIPTION OF THE DRAWINGS

The present invention will be discussed below in detail with reference to the accompanying drawings, in which.

DESCRIPTION OF THE EMBODIMENTS

Figure 1:
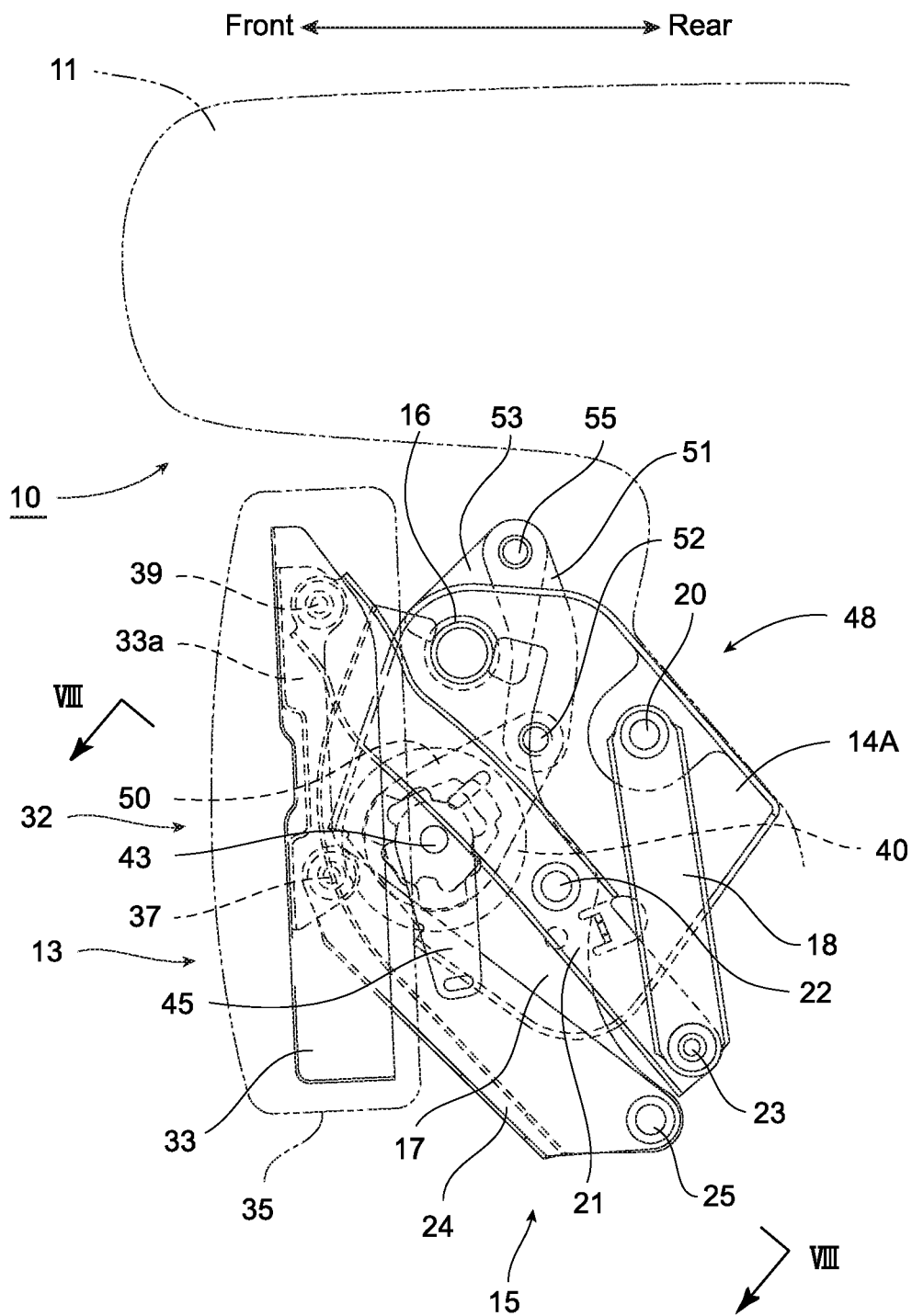
FIG. 1 is a side elevational view of a seat cushion and a manually-operated footrest apparatus of an embodiment of a vehicle seat according to the present invention when a footrest is in the retracted position, wherein the footrest apparatus is installed at the front of the seat cushion, and wherein a spring-side link mechanism is removed for clarity.

An embodiment of the present invention will be hereinafter discussed with reference to the attached drawings. Directions described in the following description are defined based on the directions of arrows shown in the drawings.

FIG. 1 shows an embodiment of a vehicle seat 10 according to the present invention. The vehicle seat 10 is a reclining seat having a seat cushion 11 and a seat back (not shown). The seat cushion 11 is directly or indirectly fixed to a vehicle floor, and the seat back is pivotally connected to the rear of the seat cushion 11. A manually-operated footrest (ottoman) apparatus 13 is installed onto the front end of the lower surface of the seat cushion 11 of the vehicle seat 10.

The structure of the footrest apparatus 13 will be discussed hereinafter.

The footrest apparatus 13 is provided with a pair of left and right fixed members (stationary members/brackets) 14A and 14B. The footrest apparatus 13 is provided with a cylindrical connecting shaft 16 which extends in the leftward/rightward direction, and both ends of the connecting shaft 16 are rotatably fitted into two circular holes which are formed in the pair of left and right fixed members 14A and 14B, respectively.

Figure 3:
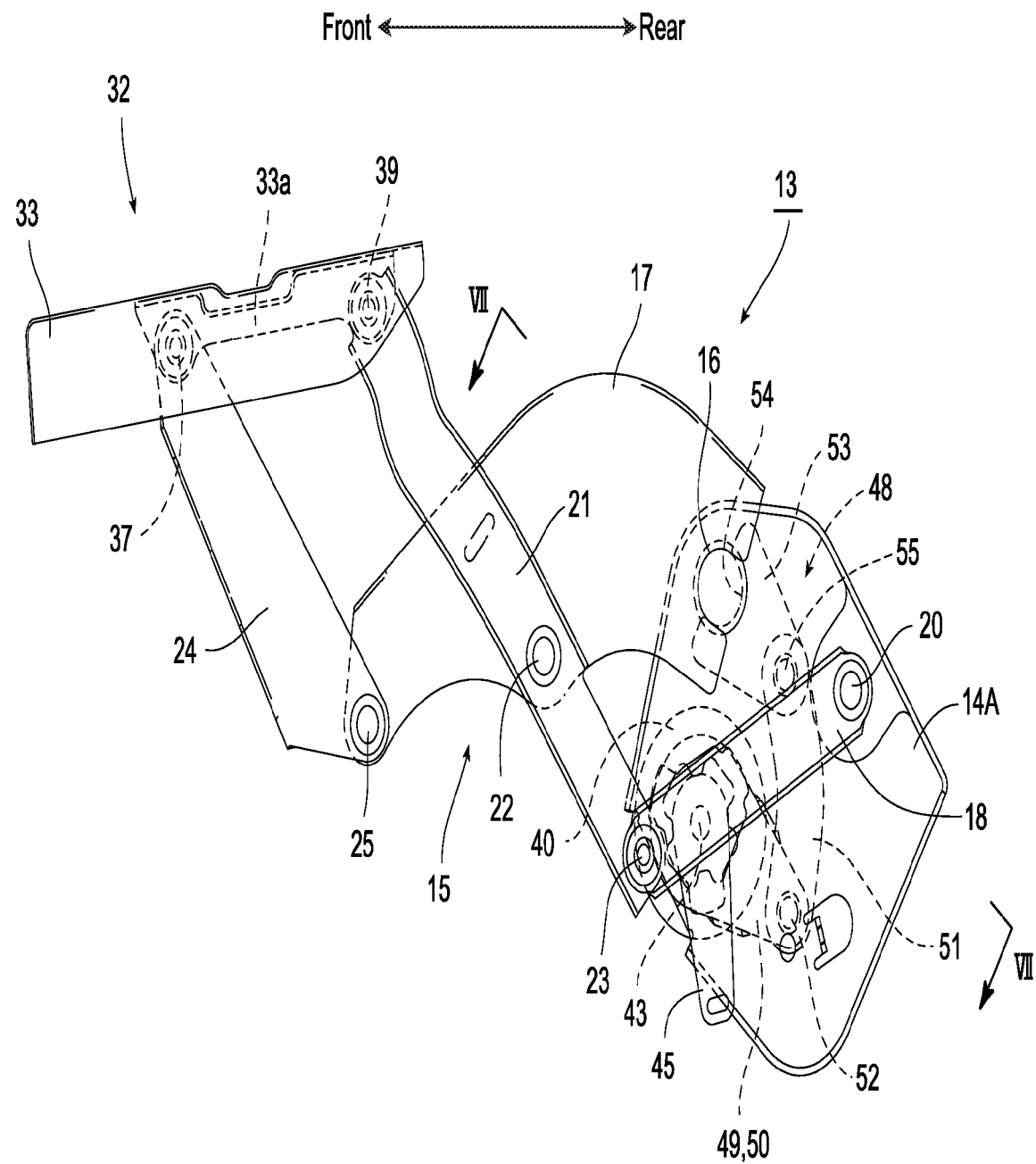
FIG. 3 is a side elevational view of the manually-operated footrest apparatus with the spring-side link mechanism removed for clarity when the footrest is extended to the front end (foremost) position.

The footrest apparatus 13 is provided with an upper link (second integrated link member) 17, provided towards the fixed member side, having a U-shaped cross section, that has a pair of left and right link members (second link members) 17b (see FIG. 5), and two connecting recesses 17a which are formed in the left and right link members 17b are fixedly fitted onto the connecting shaft 16 at two different points thereon, respectively. The upper link 17 is an integrally molded product which is obtained by press-molding a single sheet of metal plate. The upper link 17 is provided with the pair of left and right link members 17b and a connecting member (second connecting member) 17c. The connecting member 17c is formed from a plate extending in the leftward/rightward direction and is connected at the left and right edges thereof to common (same-side) edges (upper edges with respect to FIGS. 3 and 4) of the pair of left and right link members 17b, respectively. The pair of left and right link members 17b are orthogonal to (normal to) a straight line extending in the leftward/rightward direction, and the upper link 17 is generally bisymmetrical in shape. In addition, the footrest apparatus 13 is provided with a pair of left and right lower links 18, provided towards the fixed member side, which are pivotally connected at one end (upper end with respect to FIG. 5) thereof to the pair of left and right fixed members 14A and 14B via a pair of left and right pivot pins 20, respectively, which extend in the leftward/rightward direction. As shown in the drawings, the upper link 17 and the pair of lower links 18 are substantially parallel to each other as viewed from the side, and the pair of lower links 18 are substantially half the length of the upper link 17 as viewed from the side. The footrest apparatus 13 is provided with a pair of left and right rear links 21, provided toward the footrest side, which extend in a different direction from the upper link 17 and the pair of lower links 18. Middle portions of the pair of left and right rear links 21 are pivotally connected to middle portions of the pair of left and right link members 17b of the upper link 17 via a pair of left and right pivot pins 22, respectively, which extend in the leftward/rightward direction, while one end (the lower end with respect to FIG. 5) of the pair of left and right rear links 21 are pivotally connected to the other end (the lower end with respect to FIG. 5) of the pair of lower links 18 via a pair of left and right pivot pins 23, respectively, which extend in the leftward/rightward direction. The footrest apparatus 13 is provided with a front link (first integrated link member) 24, provided on the footrest side, having a pair of left and right link members (first link members) 24a which are substantially parallel to the pair of left and right rear links 21, and one end (the lower end with respect to FIG. 5) of the pair of left and right link members 24a are pivotally connected to one end (the front end with respect to FIG. 3) of the pair of left and right link members 17b of the upper link 17 via a pair of left and right metal pivot pins 25, respectively, which extend in the leftward/rightward direction. The front link 24 is U-shaped in cross section and formed as an integrally molded product which is obtained by press-molding a single sheet of metal plate. The front link 24 is provided with the pair of left and right link members 24a and a connecting member (first connecting member) 24b. The connecting member 24b is made of a plate extending in the leftward/rightward direction and is connected at both left and right edges thereof to common (same-side) edges (the front edges with respect to FIGS. 3 and 4) of the pair of left and right link members 24a, respectively. The pair of left and right link members 24a are orthogonal to (normal to) a straight line extending in the leftward/rightward direction, and the front link 24 is generally bisymmetrical in shape. As shown in the drawings, the upper link 17 is smaller in dimensions in the leftward/rightward direction than the front link member 24, and the left and right link members 17b are positioned between the left and right link members 24a as viewed from the front (as viewed in a plan view) (see FIGS. 6 and 8). The upper link 17 and the front link 24 are connected to each other to be rotatable relative to each other by the pair of left and right pivot pins 25, which are first inserted into pin insertion holes 17d of the pair of left and right link members 17b and into pin insertion holes 24c of the pair of left and right link members 24a of the front link 24 from the inner sides (from the sides between the pair of left and right link members 17b) (see FIG. 5) with the aforementioned one end of the pair of left and right link members 17b of the upper link 17 being positioned between the aforementioned one end of the pair of left and right link members 24a of the front link 24, and subsequently welding the inner end of each pivot pin 25 to an inner surface of the associated link member 17b (specifically to an area of this inner surface around the perimeter of the associated pin insertion hole 17d). The outer ends of the pair of left and right pivot pins 25 (portions of the pair of left and right pivot pins 25 which are positioned on the outer side of the pin insertion holes 24c) are smaller in diameter than the pin insertion holes 24c and are not provided with any retainers for preventing the pivot pins 25 from falling out. However, the length (dimensions in the leftward/rightward direction) of the outer end of each pivot pin 25 that is positioned outside the associated pin insertion hole 24c is greater than the distance (clearance dimensions) between the associated link members 17b and 24a in the leftward/rightward direction, so that the upper link 17 does not come off the pair of left and right pivot pins 25.

The connecting shaft 16, the upper link 17, the lower links 18, the pivot pins 20, the rear links 21, the pivot pins 22 and 23, the front link 24, the pivot pins 25 and a spring-side link mechanism 57 (which will be discussed later) form elements of a link mechanism 15. The link mechanism 15 can change its shape to the shape shown in FIGS. 1 and 2 when the link mechanism 15 is in a contracted state (fully contracted state), the shape shown in FIGS. 3 and 4 when the link mechanism 15 is in a fully developed state, and other shapes when the link mechanism 15 is at different stages between the contracted state and the fully developed state.

In addition, the left link member 17b, the left lower link 18, the left rear link 21 and the left link member 24a rotate in synchronization with the right link member 17b, the right lower link 18, the right rear link 21 and the right link member 24a, respectively.

The footrest apparatus 13 is provided with a footrest (ottoman) 32 which is rotatably attached to the front ends of the pair of left and right rear links 21 and the front ends of the pair of left and right link members 24a of the front link 24. The footrest 32 is provided with a rectangular base plate 33 which is elongated in the leftward/rightward direction, and a cushion 35 (shown by an imaginary line in FIGS. 1 and 2) which is firmly fixed to the surface and periphery of the base plate 33.

The base plate 33 is firmly secured to a pair of left and right securing brackets 33a, and the front ends of the pair of left and right link members 24a of the front link 24 are pivotally connected to the pair of left and right securing brackets 33a via a pair of left and right pivot pins 37, respectively, which extend in the leftward/rightward direction. The other end (the lower end with respect to FIG. 5) of the pair of left and right rear links 21 are pivotally connected to the pair of left and right securing brackets 33a via a pair of left and right pivot pins 39, respectively, which extend in the leftward/rightward direction. The footrest 32 is rotatably supported by the link mechanism 15 (the rear links 21 and the front link 24) as described above, thus varying the distance in the forward/rearward direction from the footrest 32 to the fixed members 14A and 14B in the forward/rearward direction in association with the extension/contraction operation of the link mechanism 15. Namely, the footrest 32 is in the retracted position (initial position) shown in FIGS. 1 and 2 when the link mechanism 15 is in the above described contracted state, and the footrest 32 moves into the operating range (an area in front of the fully-retracted position) when the link mechanism 15 extends forward from the contracted state. Subsequently, the footrest 32 is moved to the front end position (foremost position in the operating range thereof) shown in FIGS. 3, 4 and 6 when the link mechanism 15 fully extends forward.

The footrest apparatus 13 is provided with a locking device 40 which is mounted onto an inner side surface of the right fixed member 14A. The locking device 40 is a known type that is applicable also to the pivotally connected portion between the seat cushion 11 and the seat back. Accordingly, the detailed description about the locking device 40 is omitted herein; however, the structure of the locking device 40 will be briefly discussed hereinafter. The locking device 40 is provided, as major parts thereof, with a base plate 41, a gear plate 42, a rotational center shaft 43, a movable locking member and a spring. The base plate 41 is in the shape of a disk and fixed to the fixed member 14A by engaging a protrusion which is formed on a right side surface of the base plate 41 in a connecting hole 14A1 which is formed in the fixed member 14A. The gear plate 42 that is in the shape of a disk and smaller in diameter than the base plate 41 is engaged into a circular recess (space surrounded by an annular wall) formed in a left side surface of the base plate 41, and the outer peripheral portions (outer peripheral walls) of the base plate 41 and the gear plate 42 radially face each other. Internal gear teeth are formed on the entire inner peripheral surface of the gear plate 42 (with a structure such that a large number (e.g., a few dozen, or a hundred or more) of internal gear teeth are arranged in the circumferential direction of the inner peripheral surface of the gear plate 42). The rotational center shaft 43 extends in the leftward/rightward direction, extends through central portions of the base plate 41 and the gear plate 42, and is supported by these central portions to be rotatable relative to the base plate 41 and the gear plate 42. The aforementioned movable locking member is installed in the aforementioned circular recess of the base plate 41 to be irrotational relative to the base plate 41 and to be radially movable relative to the base plate 41. The movable locking member is provided with external gear teeth (which are smaller in number of teeth than the internal gear teeth of the gear plate 42). The movable locking member is radially movable relative to the base plate 41 between a locked position, at which the aforementioned external gear teeth are engaged with the internal gear teeth of the gear plate 42, and an unlocked position at which the aforementioned external gear teeth are disengaged radially inwards from the internal gear teeth of the gear plate 42, in association with rotational movements of the rotational center shaft 43. The movable locking member is biased toward the locked position by the biasing force of a spring, not shown in the drawings. Accordingly, when the movable locking member is in the locked position, the base plate 41 and the gear plate 42 are irrotatable relative to each other; however, rotating the rotational center shaft 43 in one direction against the biasing force of the aforementioned spring (not shown in the drawings) causes the movable locking member to move to the unlocked position, which enables the base plate 41 and the gear plate 42 to rotate relative to each other.

The footrest apparatus 13 is provided on the right side of the fixed member 14A with a rotational lever 45 which is fixed at one end (base end) thereof to the right end of the rotational center shaft 43, and an end of an operating wire 46 is connected to the other end (free end) of the rotational lever 45. An operating knob (hand-operated device), not shown in the drawings, is fixed to the other end of the operating wire 46. The locking device 40 is held in a locked state (in which the movable locking member is in the locked position) by the basing force of the aforementioned spring when the operating knob is not operated (when the operating knob is in the initial position). Operating the operating knob (moving the operating knob to the operating position) against the biasing force of the aforementioned spring causes the locking device 40 to move into an unlocked state (in which the movable locking member is in the unlocked position).

The footrest apparatus 13 is provided with a locking-device link mechanism 48 which is connected to the left side surface of the gear plate 42. The locking-device link mechanism 48 is provided with a bracket 49 (first link 50), a second link 51, a connecting pin 52, a third link 53 (connecting recessed portion 54) and a connecting pin 55.

Figure 7:
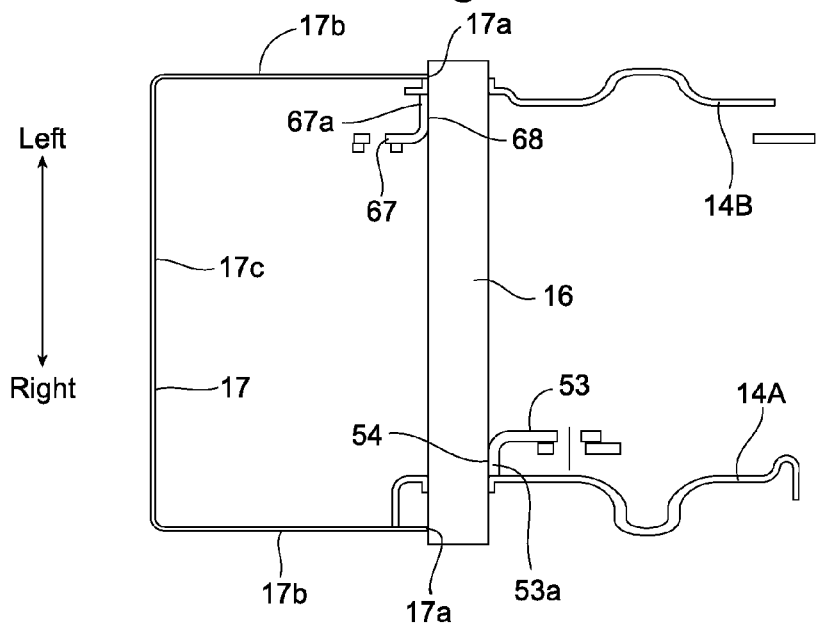
FIG. 7 is a sectional view taken along the line VII-VII shown in FIG. 3.

The bracket 49 is fixed to the left side surface of the gear plate 42, and the first link 50 is formed integral with the bracket 49 to project therefrom. The first link 50 is positioned a step to the right with respect to the bracket 49. The second link 51 has a plate-like shape, extending substantially linearly, and one end (lower end with respect to FIG. 5) of the second link 51 is positioned on the right side of the end of the first link 50, and the end of the first link 50 and the aforementioned one end of the second link 51 are pivotally connected to each other via the connecting pin 52 that extends in the leftward/rightward direction. The third link 53 has a plate-like shape, the third link 53 (except an abutting extension portion 53a thereof which will be discussed later) coincides, in the leftward/rightward direction, with the first link 50, and one end of the third link 53 is positioned on the left side of the other end of the second link 51, and the other end of the second link 51 and the aforementioned one end of the third link 53 are pivotally connected to each other via a connecting pin 55 which extends in the leftward/rightward direction. The third link 53 is integrally provided at the other end thereof with the abutting extension portion 53a, which has a plate-like shape and extends in the rightward direction. A connecting recess 54, having the shape of a circular arc in cross section (identical in curvature to the connecting shaft 16), is formed on an end surface of the other end (and the abutting extension portion 53a) of the third link 53, and the connecting shaft 16 is fixedly fitted in the connecting recess 54 (see FIG. 7). As shown in FIG. 7, the right end surface of the abutting extension portion 53a is in contact with the inner surface (left side surface) of the fixed member 14A, while the right side surface of the fixed member 14A is in contact with the left side surface of the right link member 17b. Since the fixed member 14A is sandwiched and held between the third link 53 (the abutting extension portion 53a) and the right link member 17b as described above, the fixed member 14A and the connecting shaft 16 are rotatable relative to each other without rattling.

The locking-device link mechanism 48 interconnects the fixed member 14A with the link mechanism 15 (the connecting shaft 16) via the locking device 40, and accordingly, movements of the locking-device link mechanism 48 are associated with movements of the link mechanism 15. Specifically, the locking-device link mechanism 48 is in the folded state shown in FIG. 2 when the link mechanism 15 is in the contracted state shown in FIGS. 1 and 2, and the locking-device link mechanism 48 is in the fully extended state shown in FIG. 4 when the link mechanism 15 is in the fully developed state shown in FIGS. 3 and 4. However, the locking-device link mechanism 48 merely follows movements of the link mechanism 15 (rotations of the connecting shaft 16) and therefore transmits no rotational force from the locking-device link mechanism 48 to the link mechanism 15 (the connecting shaft 16).

When the locking device 40 is in the locked state (when the movable locking member is in the locked position), the locking-device link mechanism 48 cannot operate, so that the link mechanism 15 that is associated with the locking-device link mechanism 48 cannot operate either. Therefore, by putting the locking device 40 in the locked state, the state of the link mechanism 15 and the position of the footrest 32 can be maintained.

The spring-side link mechanism 57 is installed between the inner side surface of the left fixed member 14B and the connecting shaft 16 and is provided with a first link 58 (second rotational link), a connecting pin (rotational shaft) 59, an engaging pin (engaging member) 60, a second link (first rotational link) 61, a rotational support pin (rotational shaft) 63, a third link 65, a connecting pin 66, a fourth link 67 and a connecting pin 69.

The first link 58 in which has a plate-like shape is rotatably fixed at one end thereof to an inner side surface of the fixed member 14B via the connecting pin 59 that extends in the leftward/rightward direction. As shown in the drawings, the first link 58 is provided with a spring connecting lug 58a that is formed by cutting out a part of the first link 58. An engaging pin 60 which is substantially cylindrical in shape is fixed to the opposite end of the first link 58 from the connecting pin 59 to project leftward. One end of the second link 61 in which has a plate-like shape is positioned on the left side of the other end of the first link 58. An engaging hole 62, which is configured from a hole elongated in the lengthwise direction of the second link 61, is formed in the second link 61, and the engaging pin 60 is engaged in the engaging hole 62 to be freely slidable therein. The diameter of a portion of the engaging pin 60 which is engaged in the engaging hole 62 is substantially identical to the width of the engaging hole 62, so that the engaging pin 60 slides without rattling with respect to the engaging hole 62. The rotational support pin 63 extends through the second links 61 in the leftward/rightward direction, the second link 61 is rotatable relative to the rotational support pin 63, and the left end of the rotational support pin 63 is fixed to the fixed member 14B. One end of the third link 65 in which has a plate-like shape is positioned on the left side of the other end of the second link 61. The other end of the second link 61 and the aforementioned one end of the third link 65 are pivotally connected to each other via the connecting pin 66 that extends in the leftward/rightward direction. The fourth link 67 is substantially identical in shape to the third link 53, and one end of the forth link 67 is positioned on the left side of the other end of the third link 65. The other end of the third link 65 and the aforementioned one end of the fourth link 67 are pivotally connected to each other via the connecting pin 69 that extends in the leftward/rightward direction. The fourth link 67 is integrally provided at the other end thereof with a plate-like abutting extension portion 67a which extends leftward. A connecting recess 68 having the shape of a circular arc in cross section (identical in curvature to the connecting shaft 16) is formed in an end surface of the other end (and the abutting extension portion 67a) of the fourth link 67, and a part of the connecting shaft 16 in the vicinity of the left end thereof is fixedly fitted in the connecting recess 68 (see FIG. 7).

As shown in FIG. 7, the left end surface of the abutting extension portion 67a is in contact with the inner surface (right side surface) of the fixed member 14B, while the left side surface of the fixed member 14B is in contact with the right side surface of the left link member 17b. Since the fixed member 14B is sandwiched and held between the fourth link 67 (the abutting extension portion 67a) and the left link member 17b as described above, the fixed member 14B and the connecting shaft 16 are rotatable relative to each other without rattling.

The spring-side link mechanism 57 operates substantially in synchronization with the locking-device link mechanism 48. Therefore, the spring-side link mechanism 57 is in the folded state shown in FIG. 1 when the link mechanism 15 is in the contracted state shown in FIGS. 1 and 2, and the spring-side link mechanism 57 is in the fully extended state shown in FIG. 3 when the link mechanism 15 is in the fully developed state shown in FIGS. 3 and 4.

Figure 2:
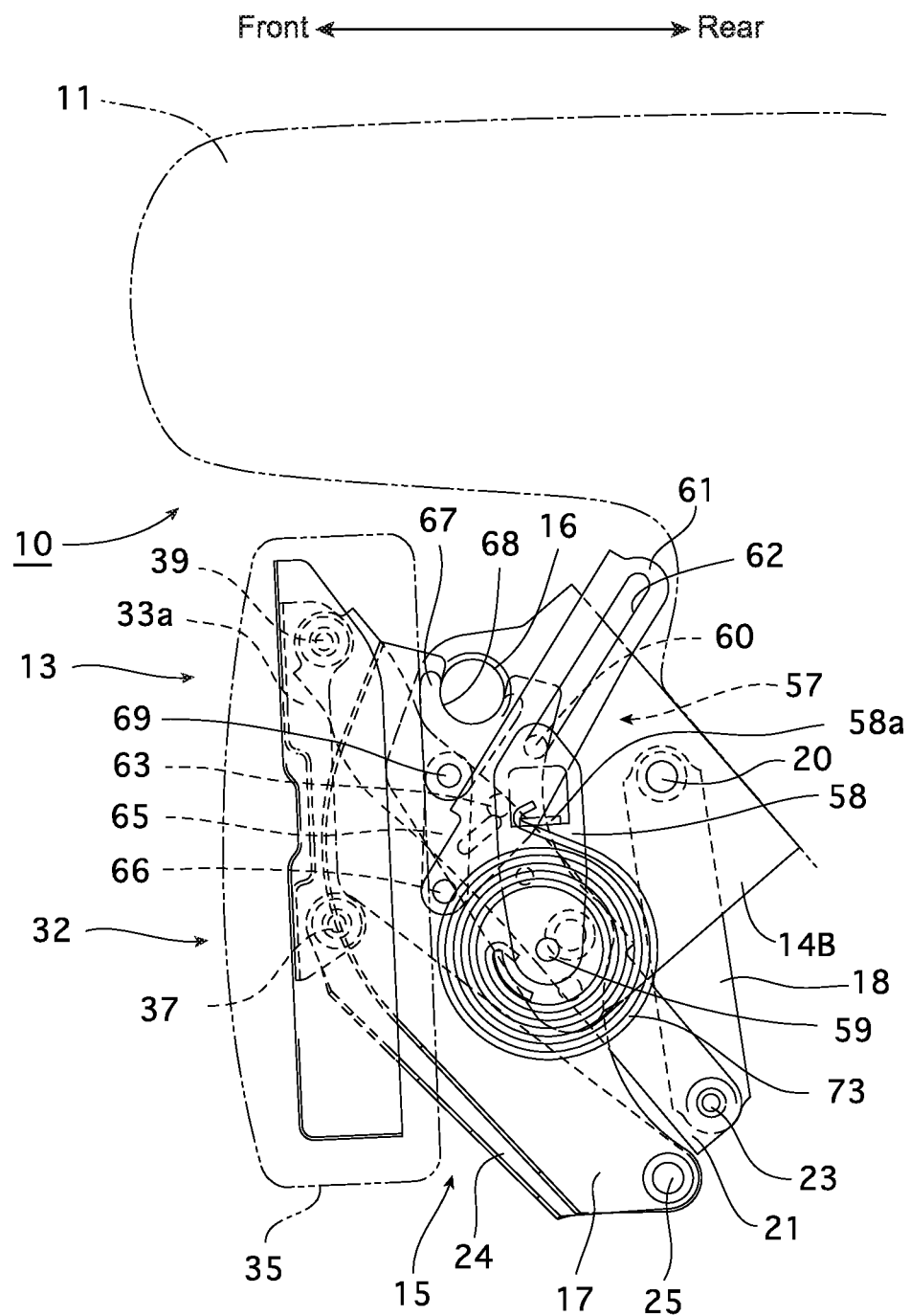
FIG. 2 is a view similar to that of FIG. 1, showing the seat cushion and the manually-operated footrest apparatus with a locking-device link mechanism removed for clarity.
Figure 4:
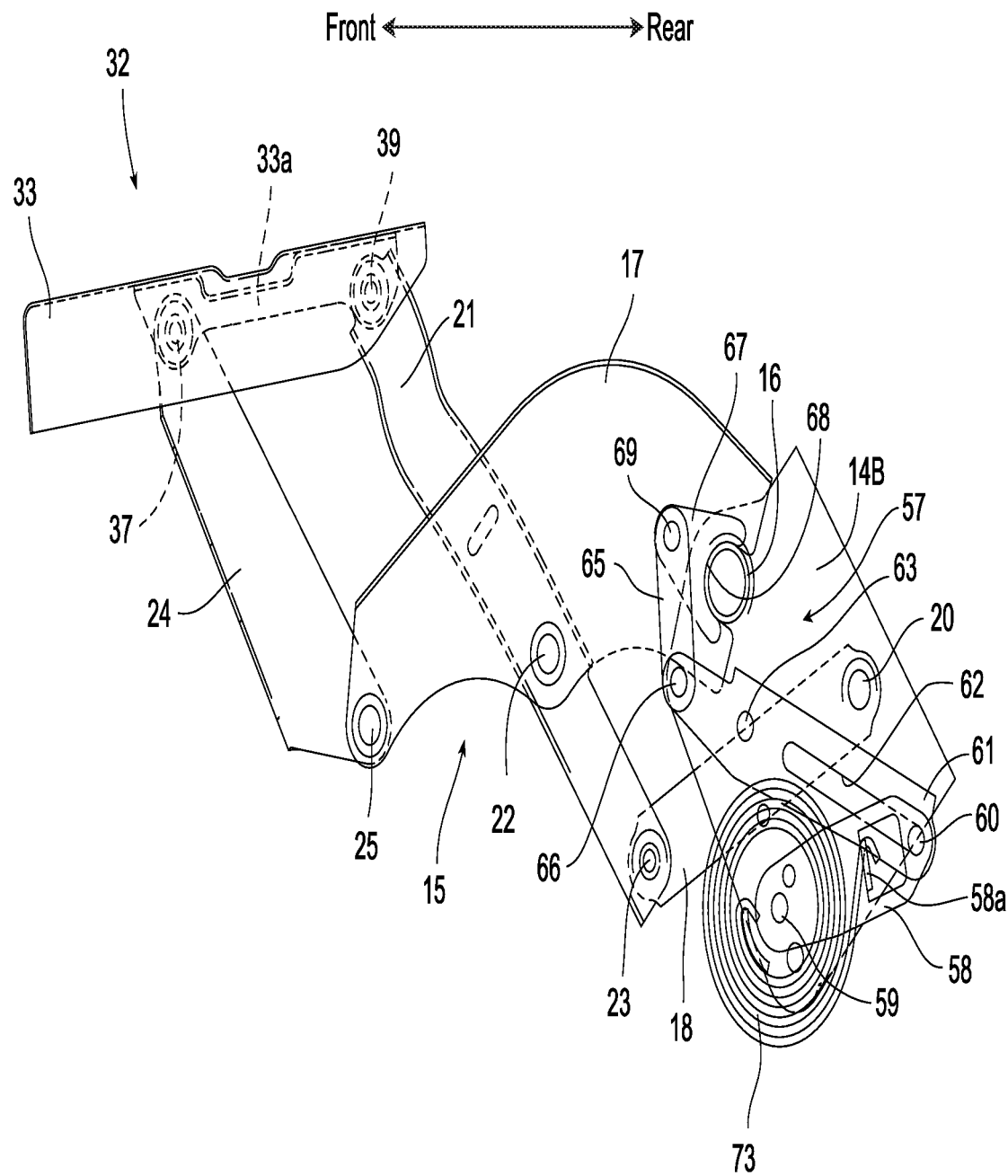
FIG. 4 is a view similar to that of FIG. 3, showing the manually-operated footrest apparatus with the locking-device link mechanism removed for clarity.

The fixed member 14B is integrally provided on a peripheral edge thereof with a mounting bracket 71 which projects rightward. The footrest apparatus 13 is provided in the vicinity of the mounting bracket 71 with a power spring (clockwork spring/spiral power spring) 73, one end (inner side end) of which is fixed to the mounting bracket 71. The other end (outer side end) of the power spring 73 is fixed to the spring connecting lug 58a of the first link 58. As shown in FIGS. 2 and 4, the connecting pin 59 stays at the central portion of the spring-side link mechanism 57, as viewed from the side, regardless of what state the spring-side link mechanism 57 (and the link mechanism 15 and the locking-device link mechanism 48) may be in.

The power spring 73 is resiliently deformable in a direction to reduce the diameter thereof from a free state. Immediately after the resiliently deformed state of the power spring 73 in the aforementioned direction is released, the power spring 73 resiliently returns to the free state, thereupon generating a rotational biasing force. Since the direction of this rotational biasing force, which is generated by the returning of the power spring 73 to its free state from the resiliently deformed state, is clockwise with respect to FIGS. 2 and 4, the spring-side link mechanism 57 is deformed toward the fully extended state shown in FIG. 3 by the rotational biasing force of the power spring 73 upon the locking device 40 moving to an unlocked state (i.e., upon the movable lock member being positioned in the unlocked position). In addition, the amount of deformation (rotational biasing force) of the power spring 73 is the greatest when the spring-side link mechanism 57 is in the folded state shown in FIGS. 1 and 2 (when the link mechanism 15 is in the contracted state shown in FIGS. 1 and 2), and the amount of deformation of the power spring 73 is progressively reduced as the link mechanism 15 extends and reduced to a minimum when the spring-side link mechanism 57 moves into the fully extended state shown in FIGS. 3 and 4 (when the link mechanism 15 is in the fully developed state shown in FIGS. 3 and 4).

The footrest 13 that has the above described structure can be mounted to the vehicle seat 10 by fixing the left and right fixed members 14A and 14B to the front end of the lower surface of the seat cushion 11 by bolts, or the like (see FIG. 1).

Operations of the footrest apparatus 13 will be discussed hereinafter.

When the footrest 32 is in the retracted position shown in FIGS. 1 and 2 (i.e., when the link mechanism 15 is in the contracted state) and the operating knob is not operated (i.e., when the operating knob is in the aforementioned initial position and the locking device 40 is in a locked state), the footrest 32 is held substantially orthogonal to the horizontal direction as shown in FIGS. 1 and 2.

Upon the locking device 40 moving into an unlocked state by the occupant manually operating the operating knob (so that it moves to the aforementioned operating position), the spring-side link mechanism 57 (and the locking-device link mechanism 48) that was held in the folded state shown in FIG. 1 extends by the rotational biasing force of the power spring 73, so that the link mechanism 15 that was in a contracted state extends forward in association with the movement of the spring-side link mechanism 57 (and the locking-device link mechanism 48). Upon the occupant releasing the operating force applied to the operating knob (so that the operating knob returns to the initial position) when the footrest 32 reaches a desired position (arbitrary position in the operating range), the locking device 40 returns to a locked state by the biasing force of the aforementioned spring of the locking device 40, so that the footrest 32 is held in the desired position by the locking device 40.

Figure 10:
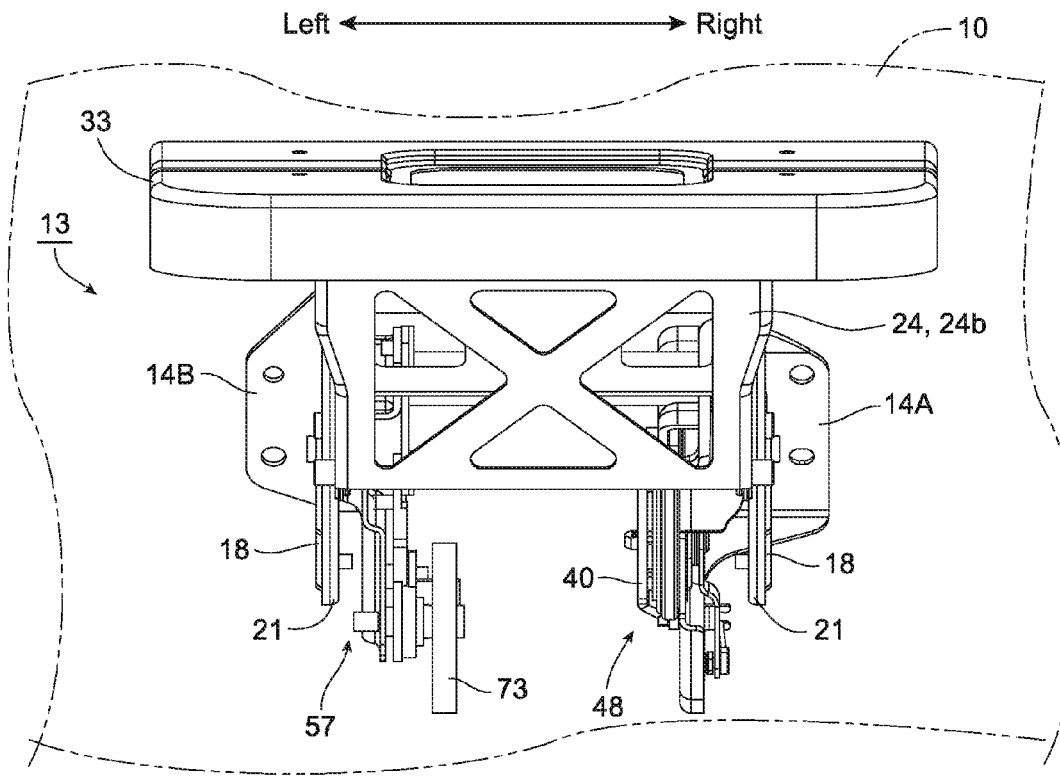
FIG. 10 is a front elevational view of the manually-operated footrest apparatus when the footrest is in the operating range (front end position).

When the footrest 32 is in the operating range as shown in FIG. 10, the connecting shaft 16, the upper link 17, the pair of lower links 18 and the pair of left and right rear links 21 are positioned between the connecting member 24b of the front link 24 and the vehicle seat 10. Accordingly, the possibility of hands, feet or the like of the occupant sitting on the vehicle seat 10 accidentally touching the connecting shaft 16, the upper link 17, the pair of lower links 18 or the pair of left and right rear links 21 can be reduced due to the connecting member 24b.

If the footrest 32 is pressed rearward against the biasing force of the power spring 73 with the locking device 40 unlocked by an operation of the operating knob after the footrest 32 moves to the aforementioned desired position, the link mechanism 15 contracts so that the footrest 32 moves toward the retracted position. Subsequently, the footrest 32 can be held in the retracted position if the locking device 40 is brought back to a locked state upon the footrest 32 moving to the retracted position.

Figure 8:
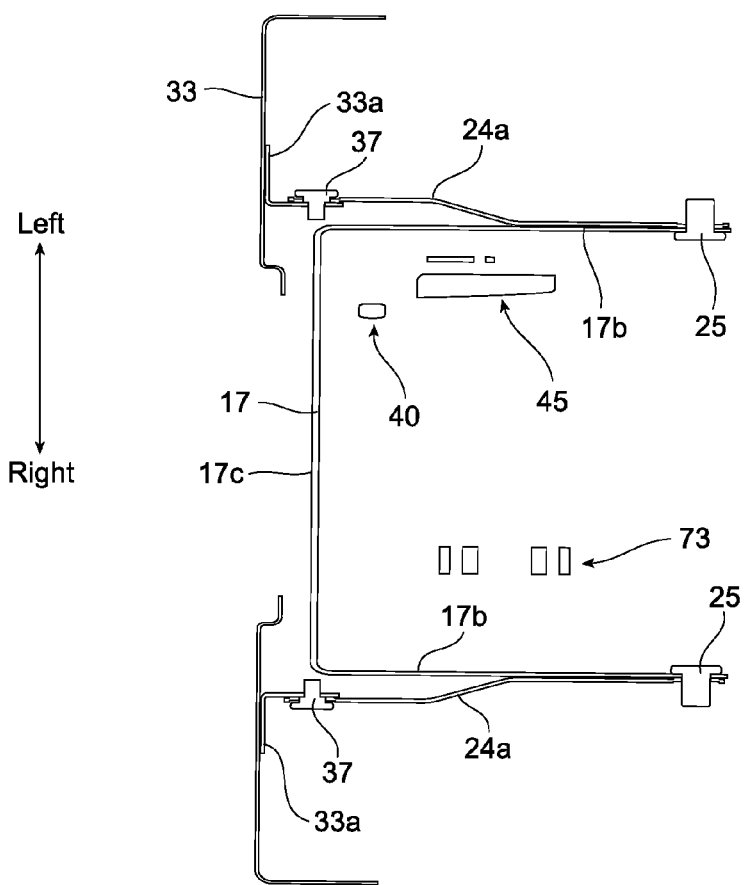
FIG. 8 is a sectional view taken along the line VIII-VIII shown in FIG. 1.
Figure 9:
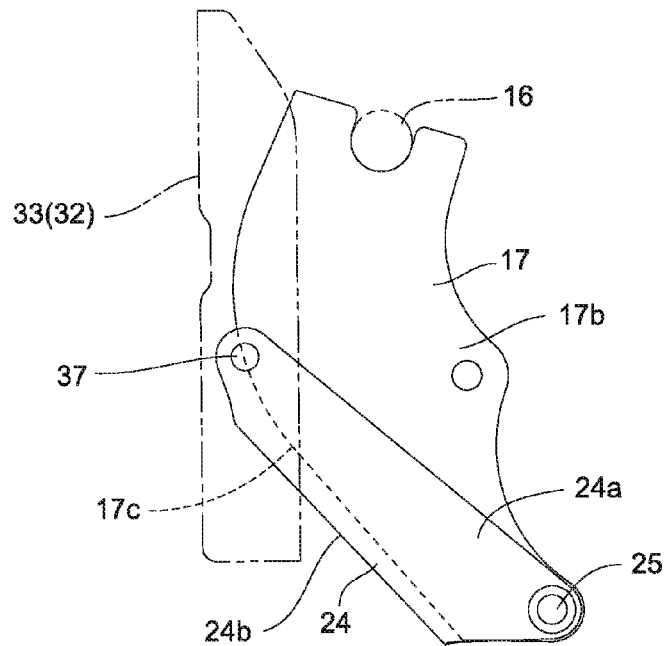
FIG. 9 is a side elevational view of the footrest (base plate), the upper link and a front link when the footrest is in the retracted position.

When the footrest 32 is in the retracted position, in addition to an end of the upper link 17 toward the pair of left and right pivot pins 25 (i.e., the lower end of the upper link 17 with respect to FIG. 9), the front lower part of the upper link 17 is also fully accommodated in the internal space of the front link 24 (in the space surrounded by the left and right link members 24a and the connecting member 24b), as shown in FIGS. 8 and 9. Furthermore, the locking-device link mechanism 48, the spring-side link mechanism 57, and the fixed members 14A and 14B are partly positioned in the internal space of the upper link 17 (in the space surrounded by the left and right link members 17b and the connecting member 17c). In addition to the rigidity of the front link 24, the rigidity of the entire part of the link mechanism 15 is also increased by connecting the left and right link members 24a by the connecting member 24b in the present embodiment; however, since the left and right ends of the connecting member 24b of the front link 24 are connected to edges (front edges with respect to FIGS. 3 and 4) of the pair of left and right link members 24a, the dimensions of the internal space of the front link 24 in the forward/rearward direction (when the footrest 32 is in the retracted position) is great; moreover, no obstructions (e.g., a member corresponding to the connecting pipe disclosed in the aforementioned Japanese Unexamined Patent Publication No. 2008-49066) exist in this internal space. This makes it possible to increase the accommodation volume of the internal space of the front link 24 for accommodating the upper link 17 therein when the footrest 32 is in the retracted position, thus making it possible to reduce the size of the entire footrest apparatus 13 in a retracted state in the forward/rearward direction.

In addition, the upper link 17 and the front link 24 are high in mechanical strength in the present embodiment of the footrest apparatus 13 because the upper link 17, which includes the left and right link members 17b, and the front link 24, which includes the left and right link members 24a, are made out of metal plates and are formed into a U-shaped members in cross section, respectively. Accordingly, the rigidity of the link mechanism 15 (the footrest apparatus 13) can be increased.

Additionally, since the upper link 17 is a press-molded product (integrated molded product) using a single sheet of metal plate, the upper link 17 is easier to produce than that in the case where the upper link 17 is made by welding link members (which correspond to the link members 17b) to a connecting member (which corresponds to the connecting member 17c) made as a separate member from the link members. Likewise, the front link 24 is also a press-molded product (integrated molded product) using a single sheet of metal plate, thus being easy to produce. Therefore, the ease of assembly of the link mechanism 15 is favorable.

Additionally, when the upper link 17 and the front link are produced, the distance in the leftward/rightward direction between the left and right link members 17b and the distance in the leftward/rightward direction between the left and right link members 24b are each fixed at a desired value. Therefore, If the pair of left and right rear links 21 are fixed to the upper link 17 and subsequently the pair of left and right lower links 18 are fixed to the pair of left and right rear links 21, the link mechanism 15 can be easily assembled (so that the distance in the leftward/rightward direction between the pair of left and right rear links 21 and the distance in the leftward/rightward direction between the lower links 18 become an desired value). Accordingly, in regard to this point also, the ease of assembly of the link mechanism 15 is also favorable.

Additionally, in the present embodiment of the footrest apparatus 13, the locking device 40 can be positioned at a peripheral position of the link mechanism 15 (in other words, in an area different from an area overlapping the link mechanism 15 as viewed from the side) because the locking device 40 is connected to the link mechanism 15 via the locking-device link mechanism 48. The locking device 40 can be installed in an easier manner than the case where the locking device 40 is positioned in an area overlapping the link mechanism 15 (in which only a narrow area exists in general) as viewed from the side.

Additionally, in the footrest apparatus 13, since the locking device 40 and the power spring 73 are connected to the link mechanism 15 via a link mechanism (the locking-device link mechanism 48 and the spring-side link mechanism 57), the locking device 40 and the power spring 73 can be positioned on the periphery of the link mechanism 15 (in other words, in a different area from an area overlapping the link mechanism 15 as viewed from the side). Accordingly, the locking device 40 and the power spring 73 can be installed in an easier manner than the case where the locking device 40 and the power spring 73 are positioned in an area overlapping the link mechanism 15 (in which only a narrow area exists) as viewed from the side.

Additionally, the footrest apparatus 13 can be mounted to the vehicle seat 10 simply by fixing the fixed members 14A and 14B to the vehicle seat 10 since the power spring 73 is installed between the fixed member 14B and the spring-side link mechanism 57. Accordingly, the footrest apparatus 13 can be easily installed to the vehicle seat 10 even though the footrest apparatus 13 is equipped with the power spring 73 that biases and moves the footrest 32.

Although the present invention has been described based on the above illustrated embodiment, the present invention is not limited solely to this particular embodiment; various modifications to the above illustrated embodiment are possible.

For instance, the footrest apparatus 13 can be modified, in design, to be a motorized footrest apparatus (not shown) by replacing some parts of the footrest apparatus 13. This design modification can be achieved by, e.g., connecting a Taumel type locking device to the fixed member 14A and the bracket 49 (of the locking-device link mechanism 48) with the locking device 40 omitted and also connecting the output shaft (rotational driving portion) of a motor unit fixed to the fixed member 14B to the Taumel type locking device. In this case, the connecting shaft 16, the upper link 17, the lower links 18, the pivot pins 20, the rear links 21, the pivot pins 22 and 23, the front link 24, the pivot pins 25 and the locking-device link mechanism 48 constitute elements of the link mechanism 15. In this case also, when the footrest 32 is in the retracted position, the front lower part of the upper link 17 and part of the locking-device link mechanism 48 are accommodated in the internal space of the front link 24.

An end of the second link 51 can be rotatably connected to the gear plate 42 (or the aforementioned Taumel type locking device) via the connecting pin 52 with the bracket 49 (and the first link 50) omitted from the locking-device link mechanism 48.

In addition, the fixed members 14A and 14B can be form into an integral (single) fixed member.

Additionally, a spring (e.g., a coil spring, a leaf spring, etc.) that is different from the spiral type power spring 73 can be installed between the fixed member (or a moving member such as a link) and the spring-side link mechanism (both ends of either type of spring can be connected to the fixed member (or a moving member such as a link) and the first link 58, respectively).

The mounting bracket 71 can be formed as a separate member from the fixed member 14B and thereafter fixed to the fixed member 14B.

Additionally, the link mechanism. 15 can be modified into a link mechanism having a different structure from the link mechanism 15 by changing the number of links, the arrangement thereof and/or the specific shape of each link.

Additionally, link members (lugs) which correspond to the third link 53, which constitutes an element of the locking-device link mechanism 48, and the fourth link 67, which constitutes an element of the spring-side link mechanism 57, can be formed integral with the connecting shaft 16 and/or the upper link 17. In addition, the bracket 49 (the first link 50), which constitutes an element of the locking-device link mechanism 48, can be formed integral with the gear plate 42.

The third link 53 (the connecting recessed portion 54) can be fixed at a center of the connecting shaft 16 in the axial direction of the connecting shaft 16 or at a position slightly to the left of the center in the axial direction of the connecting shaft 16.

Additionally, instead of the above described locking device 40 that can hold the footrest 32 selectively at a number of positions which is identical to the number of teeth of the internal gear of the gear plate 42, a locking device which can hold the footrest 32 selectively at smaller positions can be used. This type of locking device can be configured from, e.g., a plurality of lock grooves and a lock pin, wherein the plurality of lock grooves are formed on one of the link mechanism 15 and the footrest 32, and the lock pin, which is formed on the other of the link mechanism 15 and the footrest 32, is selectively engageable in the plurality of lock grooves.

Figure 5:
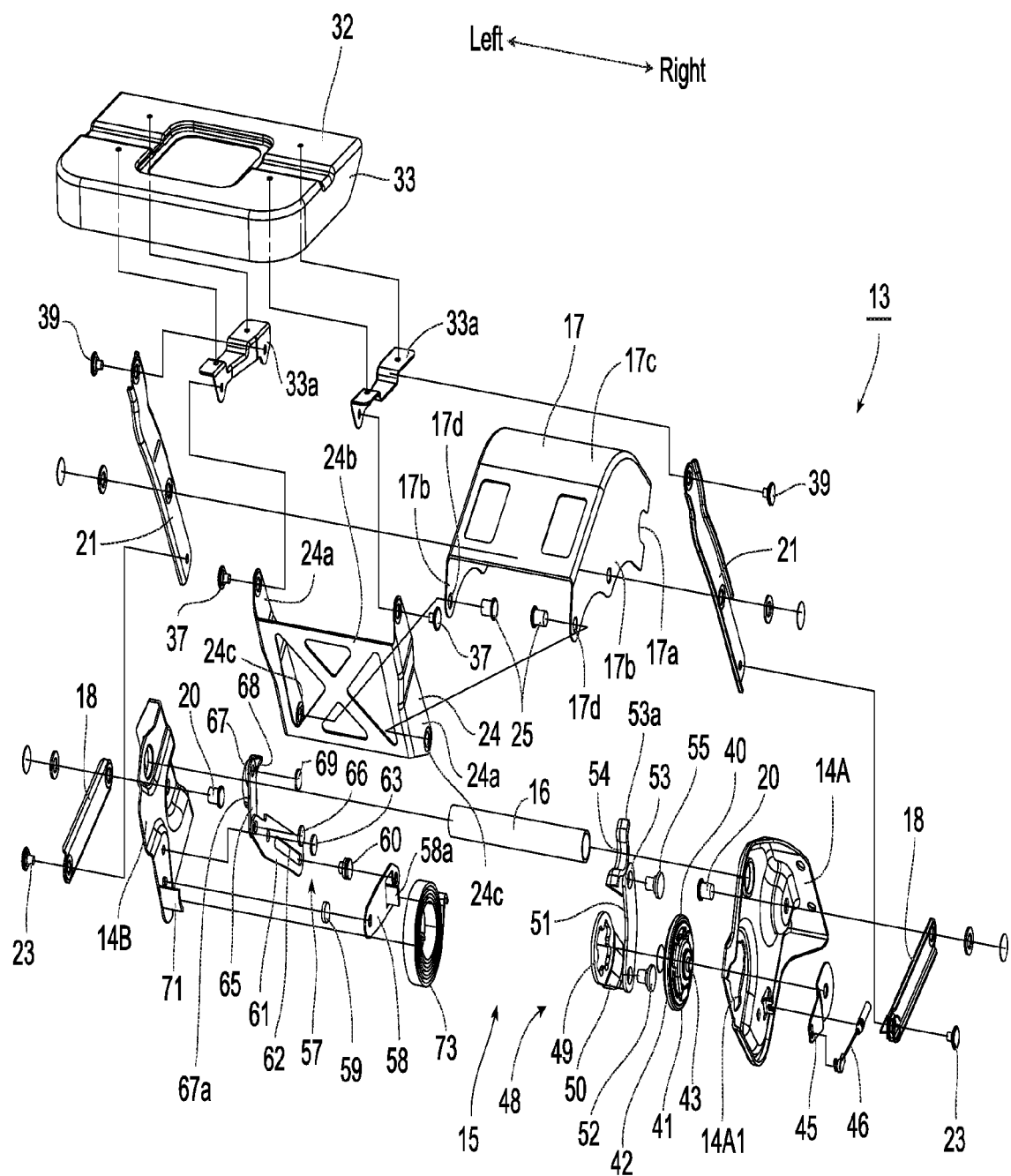
FIG. 5 is an exploded front perspective view of the manually-operated footrest apparatus.
Figure 6:
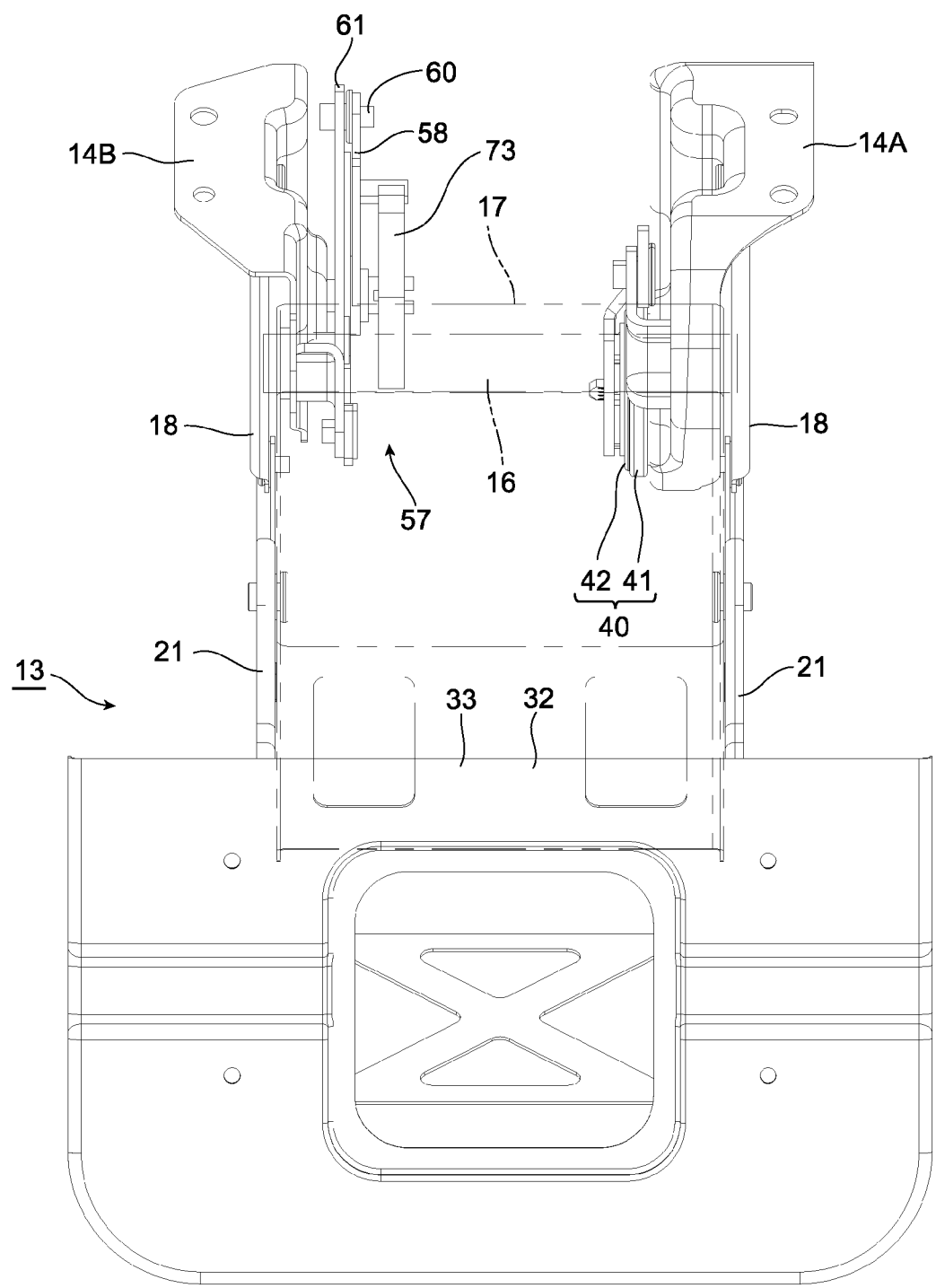
FIG. 6 is a plan view of the manually-operated footrest apparatus when the footrest is at the front end position, wherein a upper link and a connecting shaft of the manually-operated footrest apparatus are shown by imaginary lines.

To reduce the weight of the upper link 17 and the front link 24, through-holes are formed in the connecting member 17c and the connecting member 24b (specifically, two square through-holes are formed in the connecting member 17c and four triangular through-holes are formed in the connecting member 24b as shown in FIG. 5); however, these through-holes can be omitted.

Additionally, each of the upper link 17 and the front link 24 can be integrally formed from a plate by bending, which is different from press molding. Additionally, the upper link 17 can be made by forming the link members 17b and the connecting member 17c separately from each other and thereafter joining the link members 17b and the connecting member 17c together by welding or the like. Likewise, the front link 24 can be made by forming the link members 24a and the connecting member 24b separately from each other and thereafter joining the link members 24a and the connecting member 24b together by welding, or the like.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A footrest apparatus for a vehicle seat, comprising:
    a fixed member which is fixed to said vehicle seat;
    a footrest movable between a retracted position that approaches said fixed member and an operating range that is away from said fixed member; and
    a link mechanism which connects said fixed member and said footrest to each other and moves said footrest between said retracted position and said operating range by extending and contracting,
    wherein said link mechanism comprises:
  a pair of link members which rotate in synchronization with each other, each of which is formed as a plate that is orthogonal to a widthwise direction of said vehicle seat; and
    a connecting member formed as a plate which extends in said widthwise direction, wherein common edges of said pair of link members are connected to opposite ends of said connecting member in said widthwise direction, respectively, and
    wherein said footrest comprises a base plate and a cushion, wherein said base plate is elongated in said widthwise direction, and
    wherein said cushion, is fixed to the surface and periphery of said base plate.

2. The footrest apparatus according to claim 1, wherein at least one of said link mechanism and said fixed member partly enters a space surrounded by said connecting member and said pair of link members when said footrest is positioned in said retracted position.

3. The footrest apparatus according to claim 1, wherein said connecting member and said pair of link members are integrally formed from a plate by bending.

4. The footrest apparatus according to claim 1, wherein said pair of link members are connected to said footrest, and
    wherein, when said footrest is positioned in said operating range, a member of said link mechanism that is different from said connecting member and said pair of link members is positioned between said connecting member and said vehicle seat.

5. The footrest apparatus according to claim 1, wherein said connecting member comprises a first connecting member and a second connecting member,
    wherein said pair of link members comprises a first pair of link members and a second pair of link members, and
    wherein said link mechanism comprises:
    a first integrated link member which includes said first connecting member and said first pair of link members; and
    a second integrated link member which includes said second connecting member and said second pair of link members, and
    wherein said second integrated link member enters a space surrounded by said first connecting member and said first pair of link members when said footrest is positioned in said retracted position.

6. The footrest apparatus according to claim 5, wherein said first integrated link member and said second integrated link member are pivotally connected to each other to be rotatable relative to each other about an axis parallel to said widthwise direction.

* * * * *